No. 731,753. Patented June 23, 1903.

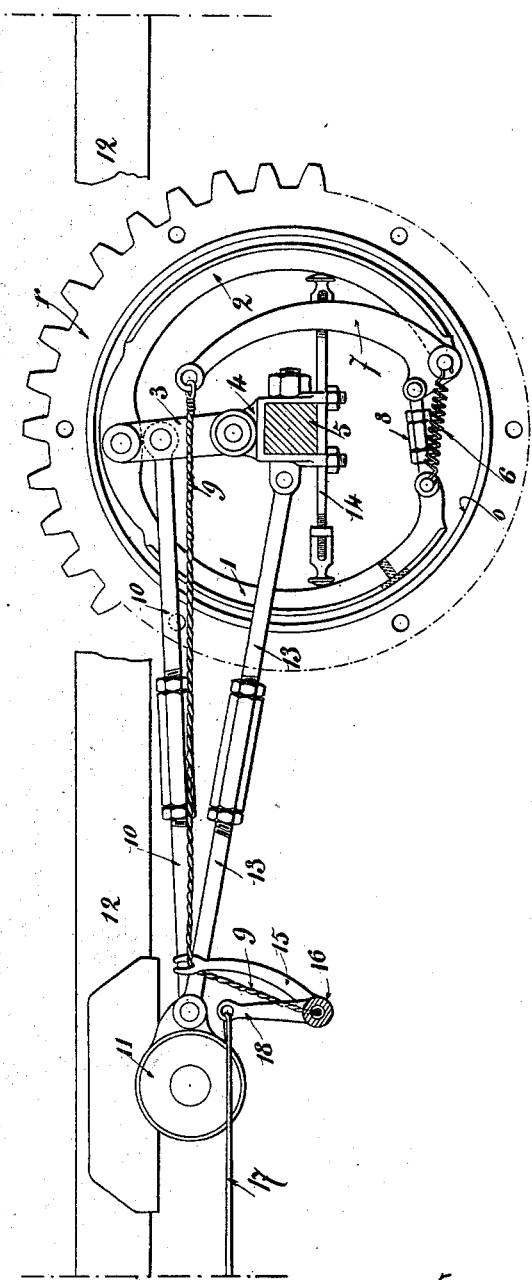

UNITED STATES PATENT OFFICE.

FERDINAND CHARRON AND LÉONCE GIRARDOT, OF PARIS, FRANCE.

BRAKE FOR MOTOR ROAD-VEHICLES.

SPECIFICATION forming part of Letters Patent No. 731,753, dated June 23, 1903.

Application filed March 22, 1902. Serial No. 99,459. (No model.)

*To all whom it may concern:*

Be it known that we, FERDINAND CHARRON and LÉONCE GIRARDOT, both citizens of the Republic of France, residing at No. 45 Avenue de la Grande Armée, Paris, in the Republic of France, have invented certain new and useful Improvements in Brakes for Motor Road-Vehicles and the Like, of which the following is a specification.

Our invention relates to a brake which is adapted to act on the internal surface of the brake-pulley and which is operative in both directions for forward and backward travel.

The ordinary brakes operating on the outside of the brake-pulleys have, generally, the disadvantages of being carried directly by the pulley and of causing continuous friction with the latter, while they are intended to be inoperative, thus producing a continuous check, a disagreeable noise, and a rapid wear of the parts.

This invention has for its object to avoid these inconveniences and to provide for means assuring other advantages.

One of the advantages of this invention is that the axle of the vehicle on which the brake is mounted does not receive any torsion strain by the braking. Another advantage proceeds from the fact that the chain-wheel and the friction-pulley are made of one piece and also from the fact that the motor-chain and the brake-blocks, which produce two forces of opposite directions, operate in the same vertical plane, which augments the power of the brake and insures its good working.

The accompanying drawing shows a specimen of construction of our brake applied to a motor road-vehicle. This brake comprises, essentially, two metallic blocks 1 and 2, pivoted one to the other by one of their ends and carried by a small rod 3, pivoted itself on a cap or socket 4, secured to the axle 5 of the vehicle. These blocks operate on the inner surface of the brake-pulley o, which is made of one piece with the chain-wheel r, secured, as usual, to the wheel of the vehicle. The free ends of the blocks 1 and 2 are connected by a spring 6, which tends to unite them. On the free end of the block 2 is pivoted, besides, a bent lever 7, the small arm of which is connected to the free end of the other block 1 by an adjustable rod 8, and the long arm of which is attached to the pulling-rope 9. On the small suspension-rod is pivoted the brake-stopping rod 10, which is attached by its other end to the support of the chain-pinion, which support 11 is, as usual, secured to the framing 12. This adjustable rod 10 resists to the strain of the brake, which would tend to be driven on one side or the other by the pulley o by the braking. When the brake is operated for the forward direction, said rod works by compression, and when the brake is operated during the backward direction the rod works by traction. Besides, the axle is connected, as usual, to the support of the chain-pinion by means of an adjustable rod 13, and the pivoting-axle of said rod on the support of the chain-pinion is the same as the one of the brake-stopping rod. These two rods 10 and 13 work always in opposite directions—that is to say, one by compression and the other by traction, or vice versa—so that no strain is transmitted to the support of the chain-pinion, which avoids the great disadvantage of the warping of the pinion, which often happens actually in a brusk braking. As to the axle, it does not receive any torsion strain from the brake, and it simply supports the weight of the same, which is insignificant.

Our brake comprises, besides, a cross-bar 14, secured to the axle and the arms of which are of an adjustable length. This cross-bar is arranged between the two blocks and limits their stroke when the brake is loosened. Besides, by the fact that these blocks rest on said cross-bar the whole forms at rest a steady figure with the axle, which is not liable of moving by the shocks nor coming into contact with the braking-pulley.

It may be seen, and this is very important, that this brake allows of making the chain-wheel and the brake-pulley of one piece and of causing the chain and the blocks to work in the same vertical plane, which allows of reducing to a minimum the distance between the fastening-point of the chain tension-rod 13 on the axle and the plane of the chain-wheel, which thus diminishing the chances of torsion of the axle allows of diminishing its section. We may also say that the arrangement of the brake allows also of removing the mud or dust which may have been gathered up.

As an additional arrangement of our brake, the pulling-cable passes in the neck or fork of a lever 15, then through a tube 16, arranged across the vehicle and forming the pivot of said lever, and leads then to the brake placed in the other side, so that when the mechanism operates by a suitable transmission on the rod 17, pivoted to the lever 18, both of the brakes operate at the same time with an equal repartition of the total strain.

Having now particularly described and ascertained the nature of our said invention and in what manner the same is to be performed, we declare that what we claim is—

1. A brake for motor-cars and other vehicles comprising a friction-pulley $o$ made integral with the chain-wheel $r$ which drives the main wheel of the vehicle, in combination with two metallic brake-blocks 1 and 2 arranged in the interior of the pulley $o$, pivoted one to the other by one of their ends and supported by a small rod 3 pivoted itself to the axle of the vehicle, in combination with a spring 6 which connects the free ends of the brake-blocks 1 and 2, in combination with a bent lever 7 pivoted to the free end of the brake-block 2 and the small arm of which is connected to the free end of the other brake-block 1 by an adjustable rod 8, while the long arm is attached to the pulling-cable 9, substantially as and for the purpose set forth.

2. A brake for motor-cars and other vehicles with a friction-pulley $o$ secured to the driving-wheel, in combination with two metallic brake-blocks 1 and 2 arranged in the interior of pulley $o$, pivoted one to each other by one of their ends and supported by a small rod 3 pivoted itself to a cap or socket 4 secured to the axle 5 of the vehicle, in combination with a brake-stopping rod pivoted by one end to the suspension-rod 3 and by the other end to the support of the chain-pinion 11, which support is secured to the framing, in combination with an adjustable rod 13 which is pivoted by one end to the support of the chain-pinion at the same point as the rod 10 and by the other end directly to the axle 5, in combination with the spring 6 which connects the free ends of the brake-blocks 1 and 2 and in combination with the bent lever 7 pivoted to the free end of the brake-block 2 and the small arm of which is connected by the adjustable rod 8 to the free end of the block 1 while its long arm is attached to the pulling-cable 9, substantially as and for the purpose set forth.

3. A brake for motor-cars and other vehicles with a friction-pulley $o$ formed by the internal surface of the driving chain-wheel $r$ and placed in the plane of the teeth of the wheel, in combination with two metallic brake-blocks 1 and 2 arranged in the interior of pulley $o$, pivoted one to the other by one of their ends and supported by a small rod 3 pivoted itself to the axle of the vehicle, in combination with a spring 6 which connects the free ends of the brake-blocks 1 and 2, in combination with a bent lever 7 pivoted to the free end of the brake-block 2 and the small arm of which is connected to the free end of the other brake-block 1 by an adjustable rod 8, while the long arm is attached to the pulling-cable 9, in combination with a cross-bar 14 secured to the axle of the vehicle between the two brake-blocks and the arms of which are of an adjustable length, substantially as and for the purpose set forth.

In witness whereof we have hereunto set our hands in presence of two witnesses.

FERDINAND CHARRON.
LÉONCE GIRARDOT.

Witnesses:
ANTOINE LAVOIN,
EDWARD P. MACLEAN.